(12) United States Patent
Schneider et al.

(10) Patent No.: US 7,497,120 B2
(45) Date of Patent: *Mar. 3, 2009

(54) SPINNING DISK ULTRASONIC TRANSDUCER ARRAY AND METHOD

(75) Inventors: John K. Schneider, Snyder, NY (US); James T. Baker, Lockport, NY (US); Stephen M. Gojevic, Buffalo, NY (US)

(73) Assignee: Ultra-Scan Corporation, Amherst, NY (US)

( * ) Notice: Subject to any disclaimer, the term of this patent is extended or adjusted under 35 U.S.C. 154(b) by 350 days.

This patent is subject to a terminal disclaimer.

(21) Appl. No.: 11/129,623

(22) Filed: May 13, 2005

(65) Prior Publication Data

US 2006/0013453 A1  Jan. 19, 2006

Related U.S. Application Data

(60) Provisional application No. 60/587,558, filed on Jul. 13, 2004.

(51) Int. Cl.
*G01N 9/24* (2006.01)
*G06K 9/00* (2006.01)

(52) U.S. Cl. .............................. 73/620; 73/622; 73/621; 382/124

(58) Field of Classification Search .................. 73/620, 73/621, 622; 600/459, 437, 443–445; 382/124
See application file for complete search history.

(56) References Cited

U.S. PATENT DOCUMENTS

| 3,721,312 | A | * | 3/1973 | St Johns | 367/7 |
| 3,882,462 | A |  | 5/1975 | McMahon | |
| 5,224,174 | A |  | 6/1993 | Schneider et al. | |
| 5,587,533 | A |  | 12/1996 | Schneider et al. | |
| 5,647,364 | A | * | 7/1997 | Schneider et al. | 600/445 |
| 5,689,576 | A |  | 11/1997 | Schneider et al. | |
| 5,935,071 | A | * | 8/1999 | Schneider et al. | 600/445 |
| 6,744,910 | B1 |  | 6/2004 | McClurg et al. | |
| 6,914,517 | B2 | * | 7/2005 | Kinsella | 340/5.83 |
| 2005/0117786 | A1 | * | 6/2005 | Schneider et al. | 382/124 |
| 2005/0157912 | A1 | * | 7/2005 | Schneider et al. | 382/124 |
| 2005/0196022 | A1 | * | 9/2005 | Schneider et al. | 382/124 |

OTHER PUBLICATIONS

Written Opinion and Search Report of The International Searching Authority for PCT/US05/16861, May 7, 2007, Ultra-Scan Corporation.

* cited by examiner

*Primary Examiner*—Hezron Williams
*Assistant Examiner*—J M Saint Surin
(74) *Attorney, Agent, or Firm*—Hodgson Russ LLP (57) ABSTRACT

The invention relates to a fingerprint scanning system and a method of scanning a fingerprint. A system according to the invention may have (a) an imaging surface capable of receiving a finger, (b) a rotatable disk, the disk having a pivot-location about which the disk rotates, (c) an ultrasound transducer joined to the disk and capable of providing information corresponding to a fingerprint of the finger, (d) a disk driver capable of rotating the disk in order to cause the transducer to move along a substantially circular path, (e) a linear driver capable of moving the pivot-location linearly, (f) a measurer capable of measuring linear positions of the pivot-location and arcuate positions of the transducer; and (g) a coupler capable of producing sets of coupled information, each set comprising one linear position of the pivot-location, one arcuate position of the transducer and information produced from the transducer at the pivot-location and arcuate position.

18 Claims, 7 Drawing Sheets

SPINNING DISK ULTRASONIC TRANSDUCER ARRAY AND METHOD

CROSS-REFERENCE TO RELATED APPLICATION

This application claims the benefit of priority to U.S. provisional patent application Ser. No. 60/587,558, filed on Jul. 13, 2004.

FIELD OF THE INVENTION

The present invention relates to analyzing the skin friction ridge detail of one or more fingers. Information produced by such an analysis may be used to provide an image of the friction ridge surface of the finger or fingers in contact with a surface.

BACKGROUND OF THE INVENTION

A device according to the invention may be embodied as a fingerprint scanner capable of obtaining a fingerprint image of one or more fingers using ultrasound measurement techniques. Such a device may move an ultrasound transducer in a substantially planar arc, substantially parallel to a measurement surface, while linearly advancing the arc so as to produce a raster type scan image.

Multiple ultrasound transducers may be positioned on a rotatable disk. In this manner, information about the fingerprint or fingerprints (as the case may be) may be rapidly collected as a raster image representative of the fingerprint(s) of the finger or fingers. The invention may have the added advantage that, because of conservation of momentum, a smaller motor may be used and the flywheel effects of the rotating disk may allow for a more stable image than with prior art systems.

Ultrasound imaging has the ability to capture a fingerprint image in conditions considered by most fingerprint imaging systems to be severe and adverse. Ultrasound systems perform better than other types of systems when contaminants, such as oil, dirt, ink and grime, are present. Ultrasound systems also are able to capture images from a small portion of the population normally considered to be difficult to fingerprint because they have very finely detailed, worn or abraded fingerprint friction surface ridges.

SUMMARY OF THE INVENTION

The present invention includes a fingerprint scanning system. Such a system may have (a) an imaging surface capable of receiving a finger, (b) a rotatable disk, the disk having a pivot-location about which the disk rotates, (c) an ultrasound transducer joined to the disk and capable of providing information corresponding to a fingerprint of the finger, (d) a disk driver capable of rotating the disk in order to cause the transducer to move along a substantially circular path, (e) a linear driver capable of moving the pivot-location linearly, (f) a measurer capable of measuring linear positions of the pivot-location and arcuate positions of the transducer; and (g) a coupler capable of producing sets of coupled information, each set comprising one linear position of the pivot-location, one arcuate position of the transducer and information produced from the transducer at the pivot-location and arcuate position.

The invention may be embodied as a method of scanning a fingerprint. In one such method, a finger may be received on an imaging surface, and the following may be provided: (a) a disk that is pivotable about a pivot-location, (b) an ultrasonic transducer joined to the disk, and (c) a disk-driver capable of rotating the disk in order to cause the transducer to move along an arcuate path. A linear position of the pivot-location may be recorded to provide a linear recording. An arcuate position of the ultrasonic transducer may be recorded to provide an arcuate recording. An ultrasonic signal may be sent from the ultrasonic transducer toward the finger. A reflected ultrasonic signal may be received. Information about the reflected ultrasonic signal may be recorded to provide recorded signal information. For example, the information may be the time it took for the ultrasonic signal to travel from the transducer to the finger and back to the transducer. The recorded signal information may be coupled with the linear recording and the arcuate recording. Then the disk may be rotated and another set of coupled information may be generated at the same pivot-location, but at a different arcuate position. Then the disk may be moved linearly, and the process of generating coupled information may be repeated for the new pivot-location.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

Figure 1:
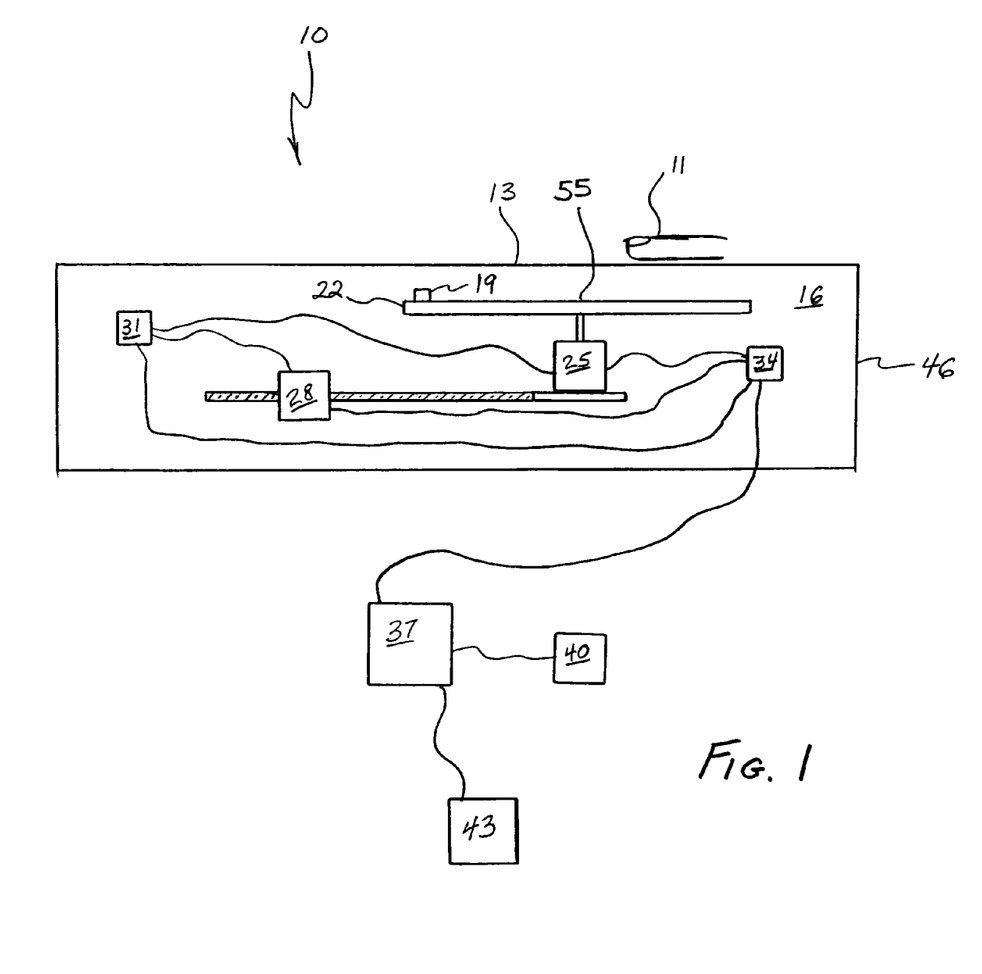
FIG. 1, which is a schematic of a device according to the invention.

FIG. 1 is a schematic of a device according to the invention. FIG. 1 shows a live-scan ultrasonic fingerprint scanning system 10. Such a system 10 may measure and image the friction ridge surface of one finger 11, or more than one finger 11 simultaneously. The scanning system 10 may include imaging surface 13 on which the finger 11 or fingers 11 being imaged may be placed. The imaging surface 13 may be a substantially planar, polished synthetic resin, such as polycarbonate. A fluidic ultrasound transmission medium 16 may be in contact with the imaging surface 13 on the side opposite the finger. The system 10 may also have an ultrasound measurement transducer 19 or transducers 19, a rotatable disk 22 on which the transducer 19 or transducers 19 may be attached, a means of rotating 25 the disk 22 in a plane that is substantially parallel to the plane of the imaging surface 13. Further, the system 10 may have a means of translating 28 the disk 22 substantially parallel to the imaging surface 13, a means of measuring 31 the position of the transducer 19 in both the translational direction and the angular direction, and a control system 34, which may coordinate and synchronize the motion, data collection, and data transmission. The control system 34 may include a microprocessor programmed to control the linear position of the disk 22 and the angular position of the transducer 19. Data transmitted from the scanning system 10 may be sent to a computer 37, which may arrange and modify the data so that an image of the friction ridge surface may be presented on a monitor 40. Furthermore, the data may be arranged and modified to provide a data set that can be compared to data sets stored in a database 43. The data sets in the database 43 may be fingerprint "images" used to identify an individual.

Figure 2A:
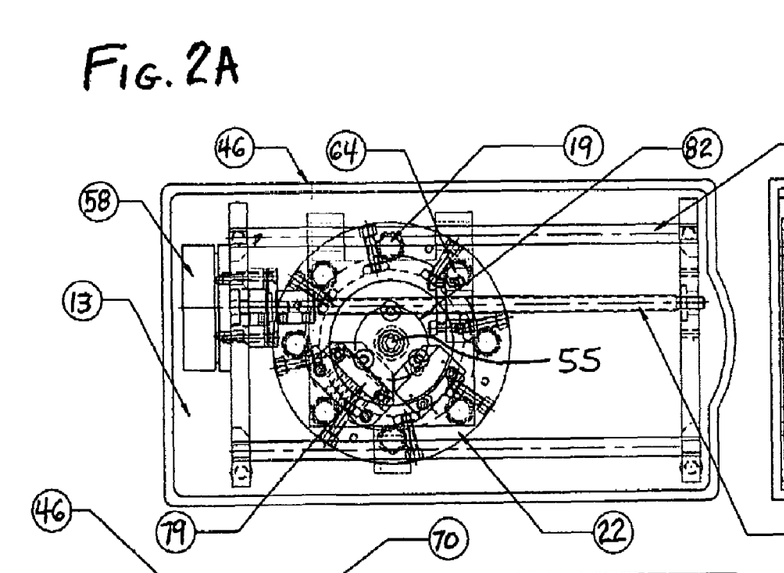
FIGS. 2A, 2B and 2C, which show a plan view, side view and end view of a device according to the invention.
Figure 2B:
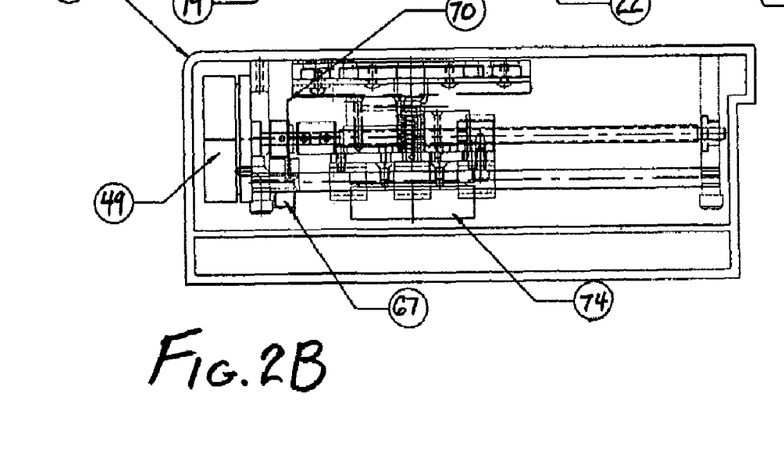
Figure 2C:
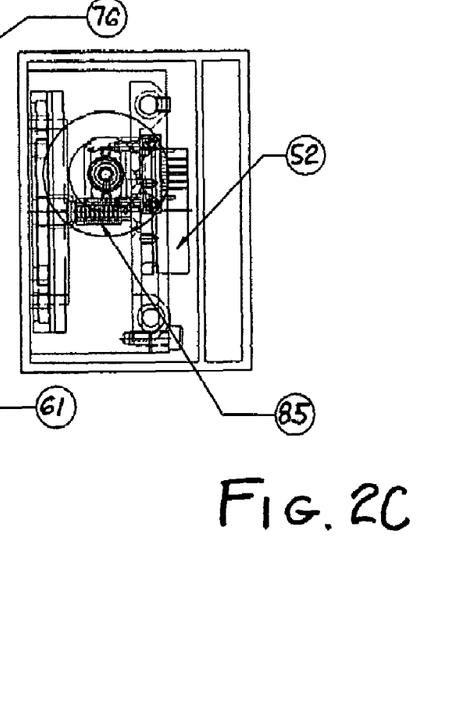

There is shown in FIGS. 2A, 2B and 2C an example of an ultrasound scanning system 10 according to the invention. The system may include a housing 46, a linear motion control subsystem 49, an angular motion control subsystem 52, and one or more transducers 19 mounted to a rotatable disk 22, which is under the control of the angular control subsystem 52. The transducers 19 may be mounted on the disk 22 so as to be substantially equidistant from a pivot-location 55, about which the disk 22 may be rotated. The linear motion control subsystem 49 and the angular motion control subsystem 52 may be used to move the disk 22 relative to one or more fingers 11 placed on the imaging surface 13.

The disk 22 may be moved in a plane parallel to the imaging surface 13. With reference to FIG. 2, the disk 22 may be translated from the left side of the housing 46 to the right side of the housing 46, while simultaneously moving the transducer 19 in an arc. Moving the transducer 19 in an arc may be achieved by moving the transducer 19 in a circle. Since it may be desirable to have information corresponding to only part of the arc traveled by the transducer 19, the transducer 19 may be turned on when the transducer 19 is in a part of the arc where data is desired, and turned off when the transducer 19 is in a part of the arc where data is not desired. Alternatively, the transducer 19 may remain on and then through the use of a computer 37, some of the collected data may be discarded, in particular those parts of the collected data that correspond to data collected by the transducer 19 while the transducer 19 is in a part of the arc where data is not desired. The computer 37 may include a memory for storing information related to the linear position and arcuate position of the transducer 19, as well as the information produced by the transducer 19 at that location.

The linear motion control subsystem 49 may have a motor 58, a lead screw 61 and a drive nut 64. The linear motion may be precisely monitored and measured by means of an optical encoder 67 and a code wheel 70. During operation of the scanner 10, the disk 22 may be maintained substantially parallel and at a substantially constant distance from the imaging surface 13 by means of a pair of adjustable slide rails 73 that allow smooth linear motion of the disk 22. The pivot location 55 may be linearly moved and controlled by the linear motion control subsystem 49 during a scanning operation.

The angular motion control subsystem 52 may be comprised of a motor 74 and a motor carriage 76. Angular motion of the disk 22 may be monitored and measured by means of an optical encoder 79 and a code wheel 82. Electrical signals from the transducers 19 may be transmitted to fixed electrical connections on the non-rotating motor carriage by means of a set of slip rings and brushes 85.

The transducers 19 and motion control subsystems 49, 52 may be immersed in insulating liquid ultrasound transmission media 16. The transmission media 16 may be necessary for sound transmission from the ultrasonic transducers 19 to the imaging surface 13, and from the imaging surface 13 back to the transducer 19. The transmission media 16 may be mineral oil.

Figure 3:
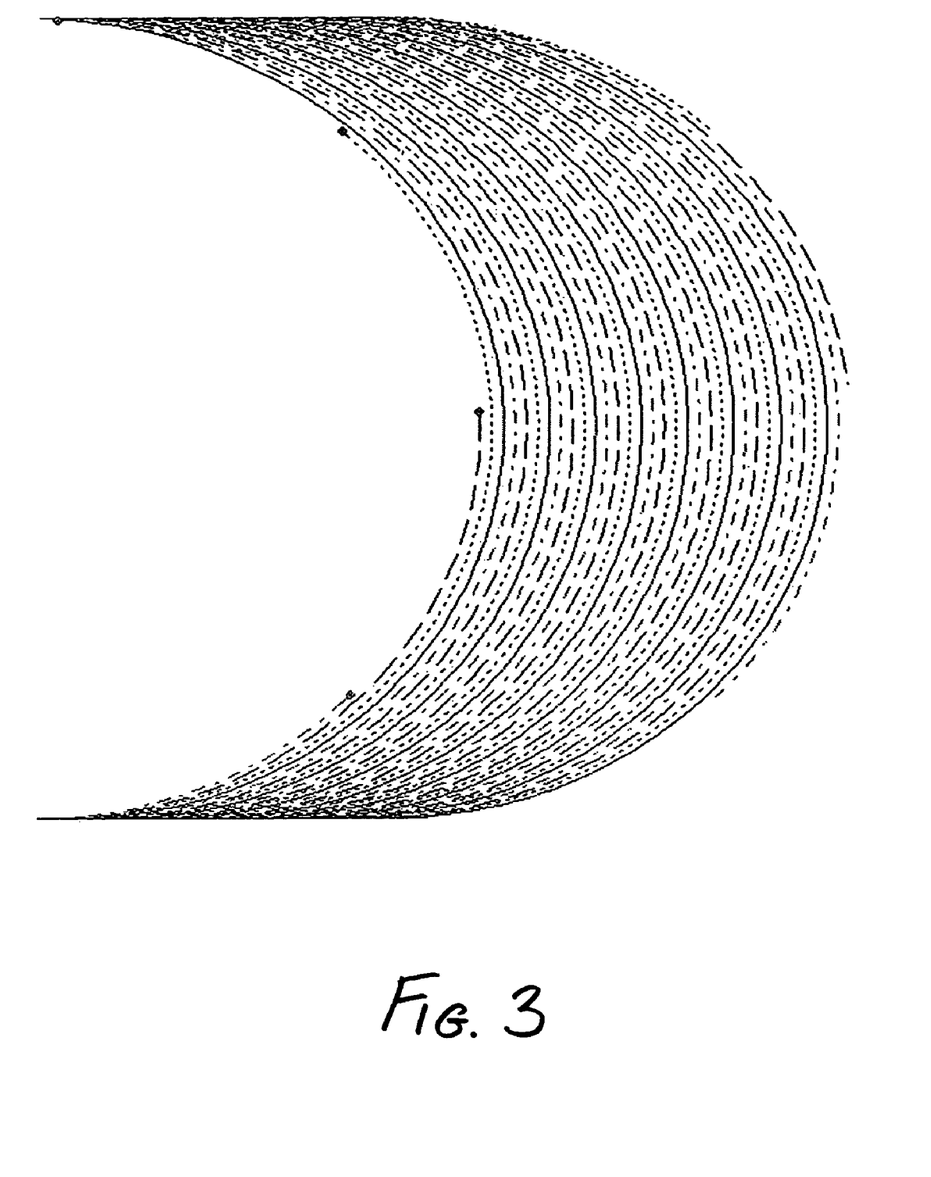
FIG. 3, which is a representation of an interlaced raster scan display which may be generated using a device according to the invention having a rotatable disk and four transducers. The traced path of each transducer is displayed in a different line style (solid, dashes, dots, and dash-dots) for the purpose of demonstrating how the collected data may be interlaced.

FIG. 3 illustrates the lines along which the transducers 19 could gather data from the friction ridge surface. For purposes of clarity, the lines for only four transducers 19 are displayed, each in a different line style. As the disk 22 translates from left to right, each transducer 19 may sweep an arc of a circle. When the first transducer 19 has completed a 360 degree arc it will have advanced to the position of its next scan line. The other transducers 19, spaced about the disk 22, will have correspondingly filled the area between the scan lines of the first transducer 19 with their own scan lines. In this manner, an interlaced image may be collected. Having more than one transducer 19 will decrease the time required to acquire an image.

Figures 4A, 4B:
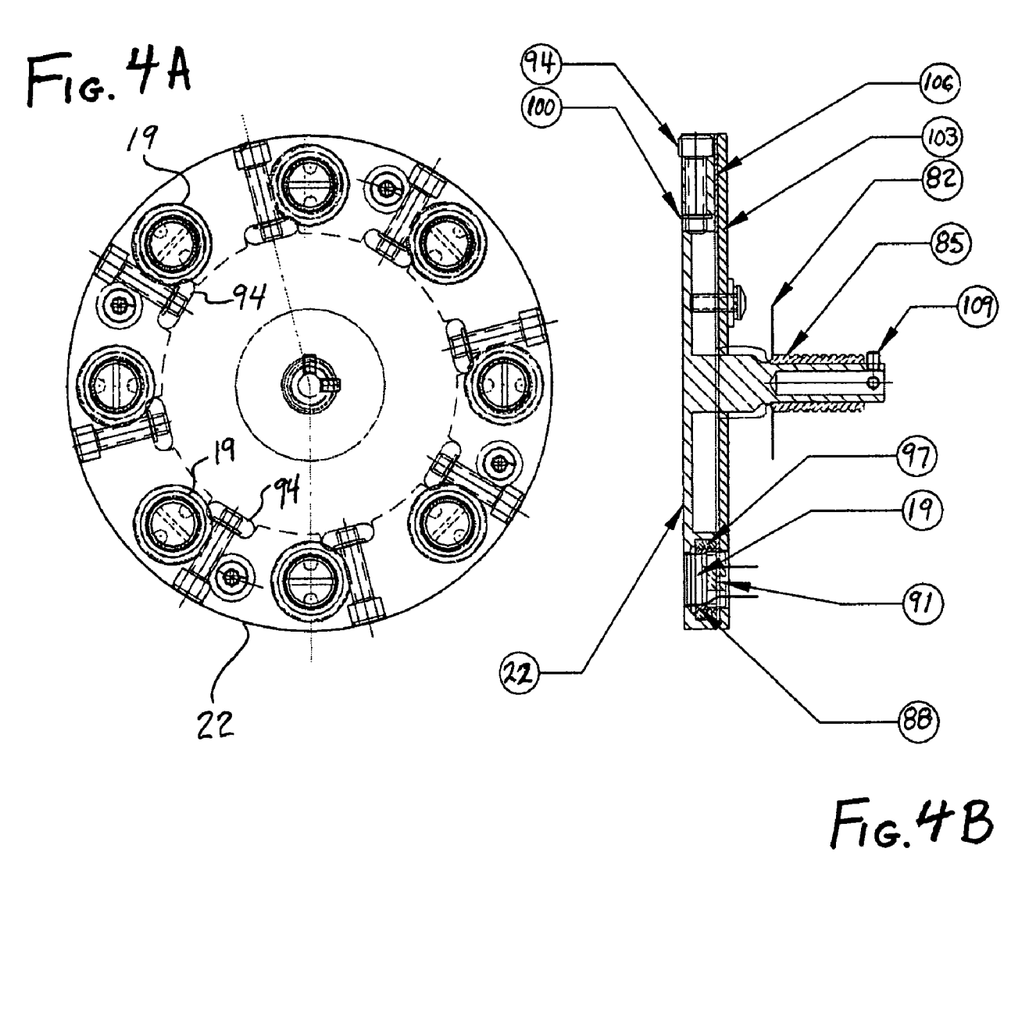
FIGS. 4A and 4B, show a plan view and a side view of a rotatable disk according to the invention.

FIGS. 4A and 4B show a disk 22 according to the invention. The disk 22 may have ultrasound transducers 19 mounted to a transducer shell 88 and backed by a slotted transducer cap 91. The transducer shell 88 may include threads for receiving a threaded alignment screw 94. A knurled transducer drive wheel 97 may be provided with the ability to rotate within a mounting hole in response to turning the alignment screw 94. In this fashion, a worm gear drive adjustment mechanism may be formed. The alignment screw 94 may be prevented from axial motion by a retaining e-clip 100. By use of this adjustment mechanism, each transducer 19 may be rotated so that it points in a particular direction and thereby is capable of gathering data along a desired arc. Electronics corresponding to control of the transducers and management of information from the transducers may be on a circuit card assembly 103 and insulated from the disk 22 by an insulator 106. The circuit card assembly 103 may be mechanically attached to the disk 22 by screws. A pair of set screws 109 may be used to fix the disk 22 to the motor shaft and a set of slip rings and brushes 85 may allow the signal from the circuit card assembly 103 to be transmitted from the transducers 19 to a computer that is not moving relative to the disk 22.

The system may periodically scan the imaging surface 13 in order to detect when a finger 11 has been presented for scanning. When a finger 11 is presented for scanning, one or more microprocessors may synchronize and control the motion of the disk 22 and processing of the signals received from the transducers 19. The angular positions of the transducers 19 may be monitored by means of an optical encoder 79 having a code wheel 82. Each timing mark of the optical encoder 79 may trigger sending an ultrasonic pulse and trigger storage of signals received from the transducers 19 when the transducers 19 are in a location that enables them to gather information about the finger 11.

Another embodiment of the system could use a mark on the disk 22 and measure the period of revolution for the mark. From this information and the desired number of data points, an electronic timing mark may be used to trigger pulses and receive data from the transducers 19. In this manner, information may be collected in a line-by-line fashion.

A linear actuator 112 may translate the rotating disk 22 substantially parallel to the imaging surface 13. The linear actuator 112 may include the linear motion subsystem 49 having the motor 58, lead screw 61 and drive nut 64. If the linear actuator 112 advances the motor carriage 76 at a rate that is much less than the speed at which the disk 22 is rotating, the transducers 19 will produce a data set which may be thought of as an advancing set of arcuate scan-lines, each having very nearly a constant radius of curvature, each scan-line being associated with a particular transducer 19. Two scan lines from a first one of the transducers 19 may be offset from each other by the distance of the scan resolution times the number of transducers 19 on the disk 22. The other transducers 19 produce data corresponding to scan lines that may be thought of as filling the area between scan lines generated by the first one of the transducers 19, to form an interlaced scan.

In a device according to the invention, there may be several sources of error. For example, the finger 11 may not be aligned with the translation of the disk 22. Such an alignment error may be accommodated by making the scan lines long enough to capture data from areas not occupied by the finger 11, and then using software to determine where the boundaries of the finger 11 exist. Data that is determined to be unrelated to the finger 11 then may be discarded.

Another potential source of error may arise from translating the disk 22 in a plane that is not parallel to the imaging surface 13. Ultrasonic transducers 19 may have an optimum focal length, and therefore they should be placed from the finger 11 at that optimum focal length, or within certain tolerances, in order to gather reliable data. If the transducer 19 is at the optimum focal length when it begins translating, but is not translated parallel to the imaging surface 13, the transducer 19 will not be at the optimum focal length for at least some portion of the translation. If the distance from the transducer 19 to the imaging surface 13 becomes such that it is outside the tolerance of the transducer 19, the transducer 19 will not produce reliable data. Adjustment screws may be provided and used to position the adjustable slide rails 73 so the transducers 19 remain at a substantially similar distance from the imaging surface 13 while being translated.

For purposes of describing another type of error, an "x-axis" is defined to coincide with the path of translation from left to right, and to coincide with a center point on the arcs over which data is collected by the transducers 19. The arc over which data is collected may be a portion of a circle scanned by the transducer 19 on the rotating disk 22. The arc over which data is collected is a function of the swept angle and the radius at which the transducer 19 is placed from the pivot-location of the rotating disk 22.

In the situation where there are two or more transducers 19 mounted on the disk 22, a source of error may arise from the transducers 19 being positioned different distances from the pivot-location 55 for the disk 22. If the transducers 19 are not equidistant from the pivot-location 55, the resulting error is referred to herein as the "arc length error". If a transducer 19 is closer to the pivot-location 55 than desired, then the arc length will be shorter than the desired arc length. If a transducer 19 is farther from the pivot-location 55 than desired, then the arc length will be longer than the desired arc length. The arc length error may be corrected by scanning an arc that is longer than the length of the desired arc, and then selecting enough data to produce a data set corresponding to an arc having the same length as the desired arc.

Figure 5:
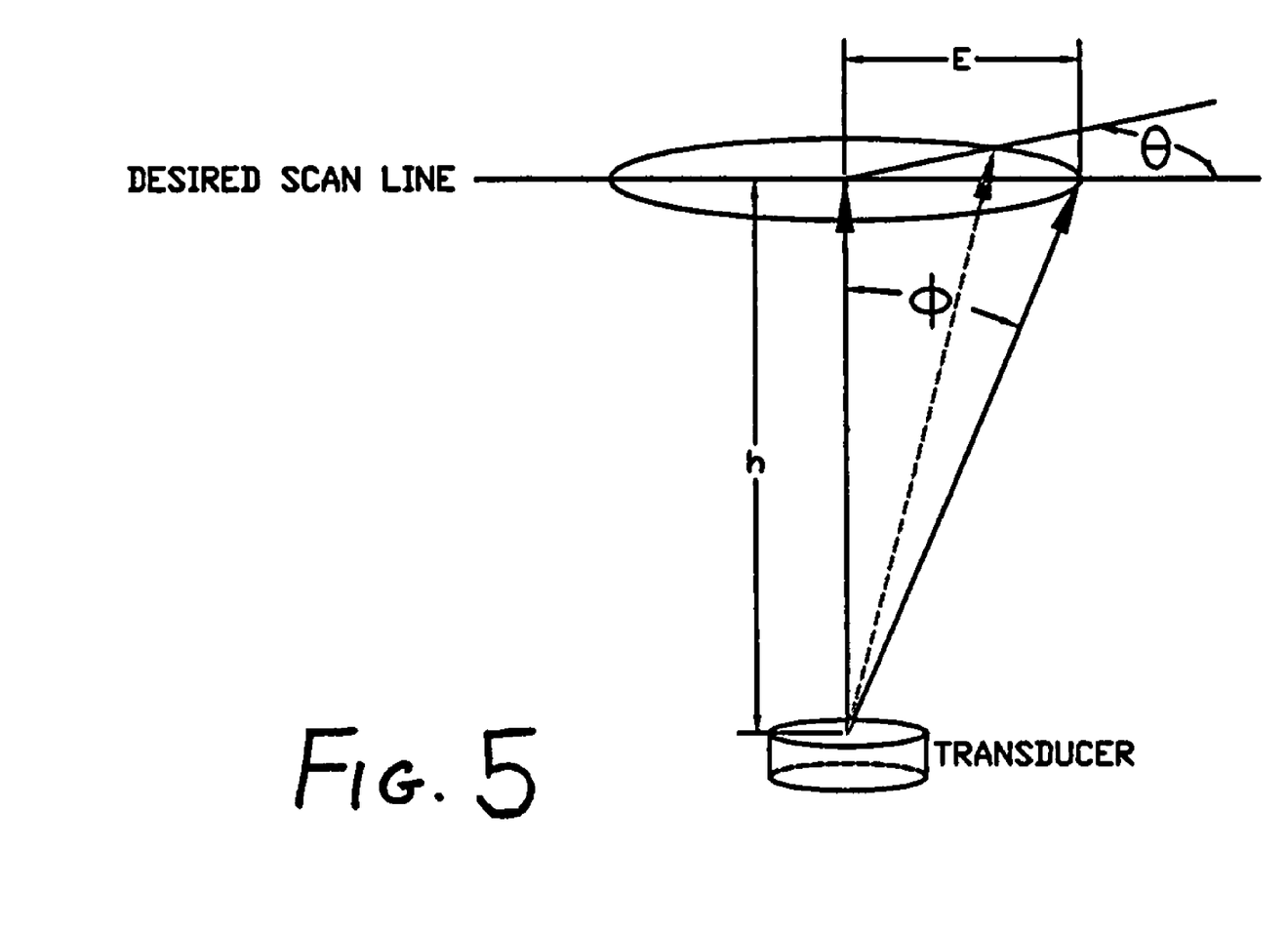
FIG. 5, which illustrates a type of error that may occur in a system according to the invention.

Another source of error may arise from the transducers sending and receiving ultrasonic energy along a line that is not perpendicular to the plane in which the transducers 19 rotate. FIG. 5 illustrates this error as the angle phi. In some circumstances phi values other than zero degrees will not produce an error that is material since the transducer 19 will still be pointing at the desired scan line. This occurs when the angle theta, shown in FIG. 5, is zero. Theta is a measure of the amount of rotation needed to cause the transducer 19 to point to the desired scan line. For simplicity purposes, theta is limited herein to being between zero and 90 degrees. The error resulting from having both phi not equal to zero degrees and theta not equal to zero degrees is referred to herein as the "pointing error". The pointing error may be corrected by rotating the transducer 19 until theta is zero degrees. It should be noted that if phi is not zero, and theta is corrected to be zero, then the transducer 19 will not be pointing in the desired location, but the transducer 19 will be pointing at the desired scan line. As discussed below, phi may be corrected by adjusting the software used to create the data set.

The transducer 19 will have a pointing angle φ associated with it. This angle may vary from transducer 19 to transducer 19. Since the ultrasonic energy is transmitted over a greater distance when phi is not zero, a focusing adjustment may be provided by a drive screw which allows the focal length of the transducer to be adjusted.

The error "E" is shown in FIG. 5, and is calculated as:

$$E = h \tan \phi$$

The error E may be taken into account by gathering data along the desired scan line prior to and after the desired arc. By calibrating the system 10, the software may be instructed to discard some of the gathered data in order to leave only the data corresponding to the desired arc.

Another type of error is the effective magnification. Each transducer 19 will have an effective image size that it will capture. If the image size is larger than desired, the images produced by adjacent transducers 19 may overlap. If the images of adjacent transducers 19 overlap, the overlap may be reduced by decreasing the angular velocity of the disk 22 or increasing the translation speed of the disk 22, or both.

Another potential error is beam spread. If the ultrasonic signal from a transducer 19 is not properly focused, then some of the ultrasonic energy from one transducer 19 may be sensed by another transducer 19. Beam spread problems can be minimized or eliminated by careful focusing of each transducer 19 element and the use of a process known as range-gating. Range gating may be accomplished at the time of calibration, and may involve measuring the time of transit for an ultrasonic pulse of energy to go from the transducer 19 to the imaging surface 13 and back again. Limits may be programmed into software to allow only the evaluation of signals that meet the range-gating requirements.

In an embodiment of the invention, a disk 22 has multiple transducers 19 mounted thereto. Each transducer 19 is aligned with a precision of less than one line (0.002 inch) in order to ensure image fidelity, with one quarter of a line (0.0005 inch) being preferred. Since Cartesian alignment would require alignment in two directions, the embodiment is based on a polar form of the invention. In the embodiment, the transducers 19 are aligned to be substantially equidistant from the pivot-location 55 for the disk 22, and each transducer 19 is rotated to point substantially to the same scan line. Rotating one or more of the transducers 19 may be accomplished by the use of a worm gear drive.

When two adjacent fingers 11 are scanned, several data sets may be made. Initially, a pair of fingers 11 may be scanned as a single image. Each individual fingerprint may be separated from the original image and stored as separate fingerprints. Each fingerprint may be feature-extracted to create separate non-image representations of the fingerprints known as templates. In addition to the two individual fingerprints, the geometric relationship between the two fingerprints may be feature-extracted and stored as a third information template. When comparing the templates against data in the database 43, these additional templates may be used to determine whether a successful match has been obtained.

Another advantage that may be realized may occur when one of the fingerprint templates is deemed closely related to a template in the database 43 but not close enough to constitute a match, and a second one of the fingerprint templates is also deemed closely related to a template in the database 43 but not close enough to constitute a match. In such a situation, the combined "scores" of the templates may be sufficient to produce a valid match. This system's reliability for successful matching may be further enhanced when using both fingerprints and their relative geometry template within a multiple biometric matching system. The present invention allows for rapid gathering of information corresponding to both fingers 11.

Figure 6A:
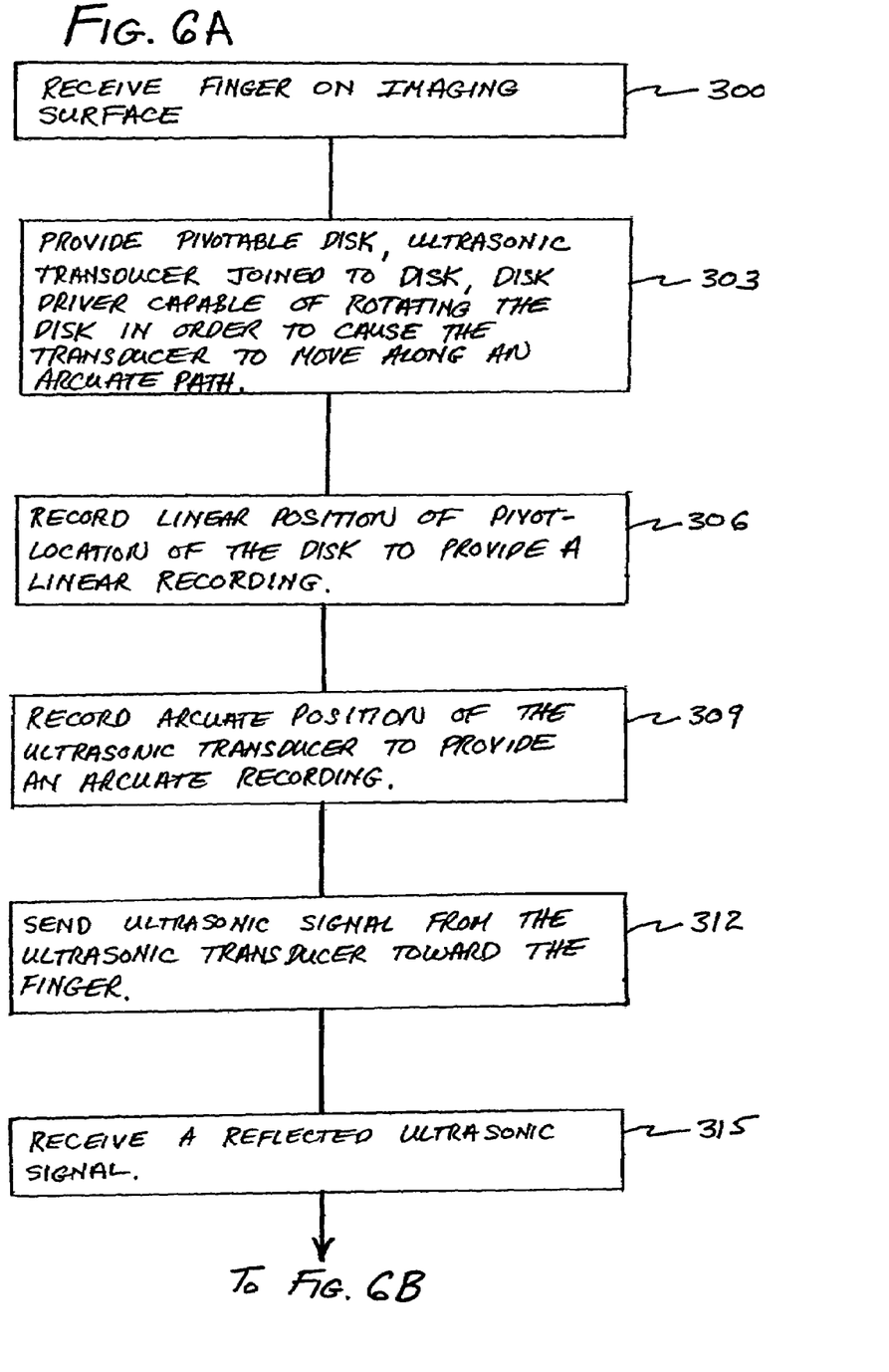
FIGS. 6A and 6B, which illustrate a method according to the invention.
Figure 6B:
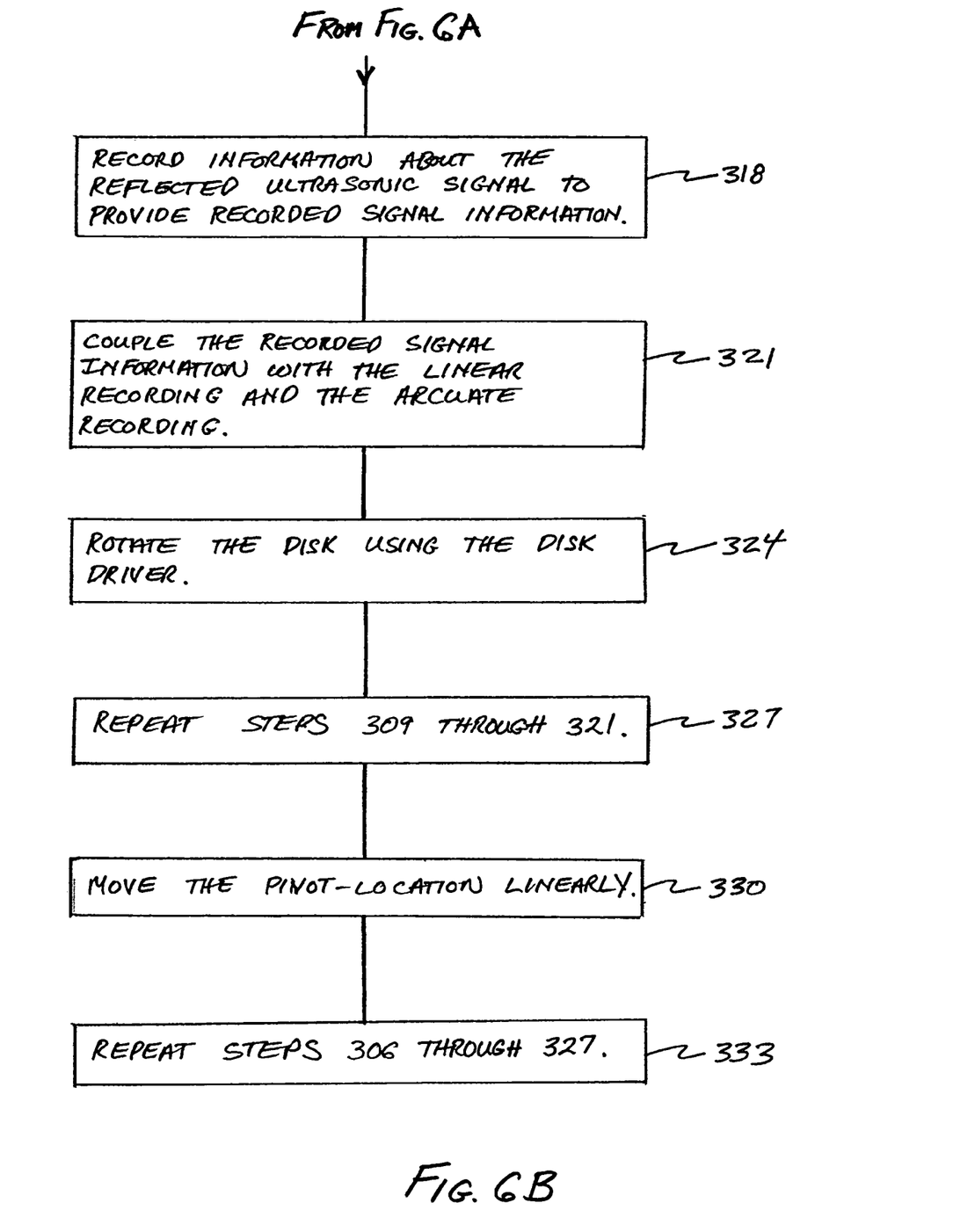

The invention may be embodied as a method of scanning a fingerprint. In one such method, a finger may be received 300 on an imaging surface. The following may be provided 303: (a) a disk that is pivotable about a pivot-location, (b) an ultrasonic transducer joined to the disk, and (c) a disk-driver capable of rotating the disk in order to cause the transducer to move along an arcuate path. A linear position of the pivot-location may be recorded 306 to provide a linear recording, and an arcuate position of the ultrasonic transducer may be recorded 309 to provide an arcuate recording. An ultrasonic signal may be sent 312 from the ultrasonic transducer toward the finger. A reflected ultrasonic signal may be received 315. Information about the reflected ultrasonic signal may be recorded 318 to provide recorded signal information. The recorded signal information may be coupled 321 with the linear recording and the arcuate recording to form a set of information. The disk may then be rotated 324 and another set of information may be obtained 327 at the new arcuate position. Then the pivot-location may be moved 330 linearly, and additional sets of information may be obtained 333 at the new pivot-location.

The foregoing method may be carried out by providing: (a) an ultrasound transducer capable of providing information corresponding to a fingerprint of the finger, (b) a disk attached to the transducer, the disk having a pivot-location, (c) a linear driver capable of moving the pivot-location linearly, the linear driver including a screw, and (d) an arcuate driver capable of moving the transducer arcuately about the pivot-location. The screw may be turned in order to move the pivot-location to a desired linear position. A first set of fingerprint information may be generated using the transducer at the linear position and a first arcuate position. The transducer may be moved arcuately to a second arcuate position using the arcuate driver. For example, the disk may be rotated about the pivot point. A second set of fingerprint information may be generated using the transducer at the linear position and the second arcuate position. This process may then be repeated for another linear position. The resulting sets of fingerprint information may be used to create an image of a fingerprint.

In another method according to the invention, the following may be provided: (a) an ultrasound transducer capable of providing information corresponding to a fingerprint of the finger, (b) a disk attached to the transducer, the disk having a pivot-location, (c) a linear driver capable of moving the pivot-location linearly, and (d) an arcuate driver capable of moving the transducer arcuately about the pivot-location. The transducer may be positioned in a waiting position, and an ultrasonic signal may be sent. A reflected ultrasonic signal may be received and used to determine whether a finger has been presented for scanning to provide a determination signal. For example, an amount of time between sending the ultrasonic signal and receiving the reflected signal may be calculated, and compared to a predetermined time, the predetermined time being an amount of time expected for an ultrasonic signal to travel from the transducer to a finger, and back to the transducer.

If the determination signal indicates a finger has been presented for scanning, then a first set of fingerprint information may be generated using the transducer at a first linear position and a first arcuate position. The transducer may be moved arcuately to a second arcuate position using the arcuate driver and a second set of fingerprint information may be generated using the transducer at the linear position and the second arcuate position.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A fingerprint scanning system comprising:
   an imaging surface capable of receiving a finger;
   a rotatable disk, the disk having a pivot-location about which the disk rotates;
   an ultrasound transducer joined to the disk and capable of providing information corresponding to a fingerprint of the finger;
   a disk driver capable of rotating the disk in order to cause the transducer to move along a substantially circular path;
   a linear driver capable of moving the pivot-location linearly;
   a measurer capable of measuring linear positions of the pivot-location and arcuate positions of the transducer; and
   a coupler capable of producing sets of coupled information, each set comprising one linear position of the pivot-location, one arcuate position of the transducer and information produced from the transducer at the pivot-location and arcuate position.

2. The apparatus of claim 1 further comprising a fluidic ultrasound transmission medium between the imaging surface and the transducer.

3. The system of claim 1, further comprising a memory in which is stored sets of coupled information corresponding to a desired portion of the circular path.

4. The system of claim 1, further comprising additional ultrasound transducers, all of which are located on the disk substantially equidistant from the pivot-location.

5. The apparatus of claim 1 further comprising a control system for controlling the position of the pivot-location.

6. The apparatus of claim 1 further comprising a microprocessor programmed to control the linear position of the pivot-location and the arcuate position of the transducer.

7. The apparatus of claim 1 further comprising a memory for storing information related to the linear position of the pivot-location and the arcuate position of the transducer, and information from the transducer.

8. The apparatus of claim 1 wherein the imaging surface is made of a polished substantially planar synthetic resin.

9. The apparatus of claim 1 wherein the transducer is joined to the disk at a location that is not coincident with the pivot-location.

10. The system of claim 1, wherein the linear driver includes a screw and a motor, and the system further includes a carriage supporting the probe arm, the carriage being movable linearly when the motor turns the screw.

11. A method of scanning a fingerprint comprising:
   (A) receiving at least one finger on an imaging surface;
   (B) providing (a) a disk that is pivotable about a pivot-location, (b) an ultrasonic transducer joined to the disk, and (c) a disk-driver capable of rotating the disk in order to cause the transducer to move along an arcuate path;

(C) recording a linear position of the pivot-location to provide a linear recording;

(D) recording an arcuate position of the ultrasonic transducer to provide an arcuate recording;

(E) sending an ultrasonic signal from the ultrasonic transducer toward the finger;

(F) receiving a reflected ultrasonic signal;

(G) recording information about the reflected ultrasonic signal to provide recorded signal information;

(H) coupling the recorded signal information with the linear recording and the arcuate recording;

(I) rotating the disk using the disk driver;

(J) repeating steps D through H;

(K) moving the pivot-location linearly;

(L) repeating steps C through J.

12. The method of claim 11 further comprising sending the ultrasonic signal through a fluidic ultrasound transmission medium.

13. The method of claim 11 further comprising utilizing a control system to control the position of the pivot-location.

14. The method of claim 13 further comprising utilizing a memory to store information related to the recorded linear position, the recorded arcuate position, and a change in time between sending the ultrasonic signal from the ultrasonic transducer and receiving the reflected ultrasonic signal.

15. The method of claim 14 further comprising using the stored information to display an image of the fingerprint.

16. The method of claim 14 further comprising recording signal information relating to a change in time between sending the ultrasonic signal and receiving the reflected ultrasonic signal.

17. A method of scanning a fingerprint, comprising:

providing (a) an ultrasound transducer capable of providing information corresponding to a fingerprint of the finger, (b) a disk attached to the transducer, the disk having a pivot-location, (c) a linear driver capable of moving the pivot-location linearly, and (d) disk driver capable of moving the transducer along a substantially circular path about the pivot-location;

positioning the transducer in a waiting position;

sending an ultrasonic signal;

receiving a reflected ultrasonic signal;

using the reflected ultrasonic signal, determining whether a finger has been presented for scanning to provide a determination signal;

if the determination signal indicates a finger has been presented for scanning, then generating a first set of fingerprint information using the transducer at a first linear position and a first arcuate position;

moving the transducer arcuately to a second arcuate position using the arcuate driver;

generating a second set of fingerprint information using the transducer at the linear position and the second arcuate position.

18. The method of claim 17, wherein determining whether a finger has been presented for scanning includes:

calculating an amount of time between sending the ultrasonic signal and receiving the reflected signal, and comparing the determined amount of time to a predetermined time, the predetermined time being an amount of time expected for an ultrasonic signal to travel from the transducer to a finger, and back to the transducer.

* * * * *